United States Patent
Nakano et al.

(10) Patent No.: US 6,850,361 B1
(45) Date of Patent: Feb. 1, 2005

(54) WIDE-ANGLE CATOPTRIC SYSTEM

(75) Inventors: Takayuki Nakano, Tokyo (JP); Yasuhisa Tamagawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 626 days.

(21) Appl. No.: 09/591,661

(22) Filed: Jun. 9, 2000

(30) Foreign Application Priority Data

Jun. 10, 1999 (JP) .......................................... 11-163813

(51) Int. Cl.[7] .............................. G02B 21/00; G02B 5/08
(52) U.S. Cl. ........................ 359/365; 359/366; 359/857
(58) Field of Search ................................. 359/364–366, 359/726–732, 738–740, 856–860

(56) References Cited

U.S. PATENT DOCUMENTS

| | | | | |
|---|---|---|---|---|
| 3,811,749 A | * | 5/1974 | Abel | 359/858 |
| 4,101,195 A | * | 7/1978 | Kosch | 359/859 |
| 4,130,757 A | * | 12/1978 | Frasher et al. | 359/366 |
| 4,135,787 A | * | 1/1979 | McLafferty | 359/858 |
| 4,598,981 A | | 7/1986 | Hallam et al. | 359/365 |
| 4,804,258 A | * | 2/1989 | Kebo | 359/365 |
| 4,964,706 A | * | 10/1990 | Cook | 359/366 |
| 5,063,586 A | * | 11/1991 | Jewell et al. | 359/859 |
| 5,414,555 A | * | 5/1995 | Chan et al. | 359/366 |

FOREIGN PATENT DOCUMENTS

| | | |
|---|---|---|
| EP | 0601871 A1 | 6/1994 |
| EP | 0 863 421 A1 | 9/1998 |
| JP | A075363 | 1/1995 |
| JP | A10111458 | 4/1998 |

* cited by examiner

*Primary Examiner*—Thong Nguyen
(74) *Attorney, Agent, or Firm*—Birch, Stewart, Kolasch & Birch, LLP

(57) ABSTRACT

A bright wide-angle catoptric system is provided which will not deteriorate the picture quality of images. The wide-angle catoptric system includes, successively from an object, a secondary reflecting mirror having a concave surface, a primary reflecting mirror having a convex surface and a tertiary reflecting mirror having a concave surface, and produces images by reflecting the luminous flux from the object at the primary reflecting mirror, the secondary reflecting mirror and the tertiary reflecting mirror successively. The system also includes a diaphragm arranged in close proximity to the primary reflecting mirror so as to have an optical axis pass through the center of the diaphragm; the optical axis is a straight line connecting the curvature center of the primary reflecting mirror to the curvature center of the secondary reflecting mirror. The tertiary reflecting mirror has its curvature center decentered from the optical axis in the direction of lesser astigmatism.

13 Claims, 4 Drawing Sheets

WIDE-ANGLE CATOPTRIC SYSTEM

BACKGROUND OF THE INVENTION

1. Field of the Invention

The present invention relates to a wide-angle catoptric system, which is used in cameras having wide-angled fields of view for observations, inspections and so forth, and which forms images of objects.

2. Description of the Related Art

The function of optical systems for use in cameras is to bend light by the refractive action of light and to produce images of an object on detectors. Optical elements having such refractive action include, for instance, lenses bending light by using the difference in refractive indexes, reflecting mirrors bending light by using reflection, and so forth.

As light transmits through lenses, lenses should be made of a material having sufficient transmittance for a desirable wavelength band. For particular wavelength bands such as ultraviolet rays and infrared rays, the materials of lenses are limited to expensive types. Moreover, the refractive index of lens materials usually has chromatic aberration that is different in size depending on the wavelength of light, so that a complex correction, the so-called achromatism, has to be carried out by combining two or more lenses having different refractive index changes in respect to a wavelength, or the like, in order to provide consistent imaging properties over a broad wavelength band.

There is no limitation on the materials for reflecting mirrors as long as their reflecting surfaces can be coated with a reflecting material having sufficient properties, so that economical optical systems may be obtained for any wavelength band. Additionally, since reflection does not rely on the wavelength of light, reflecting mirrors have no chromatic aberration and an optical system, having consistent imaging properties over a broad wavelength band, may be easily obtained.

However, in a catoptric system, incident beams to a reflecting mirror and the reflected beams appear on the same side relative to the reflecting mirror, so that the following reflecting mirror will be located on the same side as the incident beams thereof. Accordingly, the phenomenon whereby the following reflecting mirror intercepts the incident beams, termed shading, is likely to occur. A bright optical system cannot be obtained as the quantity of incident light decreases due to shading.

In order to avoid shading, there is, for example, a method whereby incident beams are tilted relative to an optical axis so as to provide an angle between the input direction and the output direction of beams. The following reflecting mirror is usually deposited in the output direction of beams, so that the following reflecting mirror will not overlap the incident beams if the input direction and the output direction of beams are different with an angle therebetween, thus not generating shading.

However, optical systems are generally designed on the basis of paraxial imaging that is achieved when incident beams are parallel to an axis of the optical systems. Accordingly, paraxial imaging will be out of focus if incident beams are tilted relative to an optical axis, thus intensifying aberration. Images will be blurred and picture quality will deteriorate, as aberration increases.

FIG. 5 is a conventional wide-angle catoptric system disclosed in U.S. Pat. No. 4,598,981: "WIDE-ANGLE FLAT FIELD TELESCOPE". The system has a brightness of F/4 and a field of view of 30° times 20°. In the optical system of FIG. 5, a primary reflecting mirror 1 has a convex spherical surface. A secondary reflecting mirror 2 has a concave ellipsoidal surface. A tertiary reflecting mirror 3 has a concave spherical surface. A circular diaphragm 4 is placed in close proximity to the primary reflecting mirror 1.

Additionally, a luminous flux 5 is the flux of incident beams to the primary reflecting mirror 1, and a luminous flux 6 is the flux of output beams from the secondary reflecting mirror 2. An optical axis 7 is a straight line connecting the curvature center of the primary reflecting mirror 1 to the curvature center of the secondary reflecting mirror 2. The center of curvature of the tertiary reflecting mirror 3 and the center of the diaphragm are also on the axis 7, providing a co-axial configuration. An incident beam is relayed onto image plane 8. Tilting incident beams relative to the optical axis 7 prevents the shading caused by overlapping beams.

In catoptric systems, the major aberrations deteriorating the picture quality of images are spherical aberration, coma, field curvature, and astigmatism. By setting parameters such as the radii of curvatures of reflecting mirrors and surface spacing based on the following principles, the wide-angle catoptric system mentioned above reduces each aberration.

Spherical aberration is caused by the deviation of focal positions between central beams and peripheral beams. In the wide-angle catoptric system, optical parameters are determined to provide almost the same deviation of a focal position of peripheral beams by the secondary reflecting mirror 2 as the deviation of a focal position of peripheral beams by the tertiary reflecting mirror 3 in the reverse direction, so that the deviations cancel each other, reducing spherical aberration. Accordingly, the spherical aberration by the primary reflecting mirror 1 still remains.

Coma is caused by the deviation of focal positions between central beams and peripheral beams for the light input with an angle relative to the optical axis 7. The above-mentioned wide-angle catoptric system determines optical parameters so as to mutually cancel the deviations at all three mirrors, the primary reflecting mirror 1, the secondary reflecting mirror 2 and the tertiary reflecting mirror 3, thus reducing coma.

Field curvature is the phenomenon whereby an image plane is curved with a curvature, and the radius of curvature thereof is expressed in a so-called Petzval sum. In the above-mentioned wide-angle catoptric system, the radii of curvatures of the primary reflecting mirror 1, the secondary reflecting mirror 2 and the tertiary reflecting mirror 3 are set so as to provide a zero Petzval sum, thus providing a zero curvature of the image plane and eliminating a field curvature.

Astigmatism is found for the light, which is input with an angle relative to the optical axis 7, when reflecting mirrors have different shapes between the tangential direction and the sagittal direction, and appears as the difference in curvature radii of an image plane between the tangential direction and the sagittal direction. In the wide-angle catoptric system described above, optical parameters are determined to provide almost the same difference in curvature radii of the image plane at the primary reflecting mirror 1 as the difference in curvature radii of the image plane at the tertiary reflecting mirror 3 in the reverse direction, so that the differences cancel each other, reducing astigmatism. Thus, the astigmatism by the secondary reflecting mirror 2 still exists.

In order to obtain a bright optical system having a small F-number in the wide-angle catoptric system as mentioned above, the aperture of the diaphragm 4 should be widened so as to increase the quantity of incident light. However, if a luminous flux is broadened by enlarging the aperture of the diaphragm 4, shading will occur. Particularly, the luminous flux 5 of incident beams to the primary reflecting mirror 1 and the luminous flux 6 of output beams from the secondary reflecting mirror 2 are in close proximity. Therefore, as the two luminous fluxes overlap each other by broadening the luminous flux, shading will occur at the overlapping section thereof.

In order to avoid shading, it is necessary to provide a large angle between incident beams and an optical axis. However, if the angle is large between incident beams and the optical axis 7, aberrations will also become serious and the picture quality will deteriorate sharply. Therefore, a problem existed in that conventional wide-angle catoptric systems could not provide a bright optical system.

SUMMARY OF THE INVENTION

It is an object of the present invention to provide a bright wide-angle catoptric system which will not deteriorate the picture quality of images, thus solving the above-mentioned problem.

A wide-angle catoptric system according to an invention includes, successively from an object, a secondary reflecting mirror having a concave surface, a primary reflecting mirror having a convex surface and a tertiary reflecting mirror having a concave surface, and produces images by reflecting the luminous flux incident from the object at the primary reflecting mirror, the secondary reflecting mirror and the tertiary reflecting mirror successively. The system also includes a diaphragm arranged in close proximity to the primary reflecting mirror so as to have an optical axis pass through the center of the diaphragm; the optical axis is a straight line connecting the curvature center of the primary reflecting mirror to the curvature center of the secondary reflecting mirror.

The tertiary reflecting mirror has its center of curvature decentered from the optical axis in the direction of lesser astigmatism.

Preferably, the tertiary reflecting mirror is moved in parallel to a surface which is orthogonal to the optical axis, thus decentering the curvature center thereof from the optical axis.

Moreover, the tertiary reflecting mirror may be arranged with its reflecting surface tilted from a surface which is orthogonal to the optical axis, in the direction of lesser astigmatism.

A wide-angle catoptric system according to another invention includes, successively from an object, a secondary reflecting mirror having a concave surface, a primary reflecting mirror having a convex surface and a tertiary reflecting mirror having a concave surface, and produces images by reflecting the luminous influx incident from the object at the primary reflecting mirror, the secondary reflecting mirror and the tertiary reflecting mirror successively. The system also includes a diaphragm arranged in close proximity to the primary reflecting mirror so as to have an optical axis pass through the center of the diaphragm; the optical axis is a straight line connecting the curvature center of the primary reflecting mirror to the curvature center of the secondary reflecting mirror. The tertiary reflecting mirror has its curvature center on the optical axis, and the reflecting surface thereof is tilted from a surface which is orthogonal to the optical axis, in the direction of lesser astigmatism.

Preferably, at least one of the primary reflecting mirror, the secondary reflecting mirror and the tertiary reflecting mirror has an aspherical surface.

Moreover, the system may further include an aberration correction plate in close proximity to the diaphragm so as to reduce spherical aberration.

Additionally, the diaphragm may be non-circular.

The diaphragm is preferably in one body with the primary reflecting mirror.

DESCRIPTION OF THE PREFERRED EMBODIMENT

First Embodiment

Figure 1:
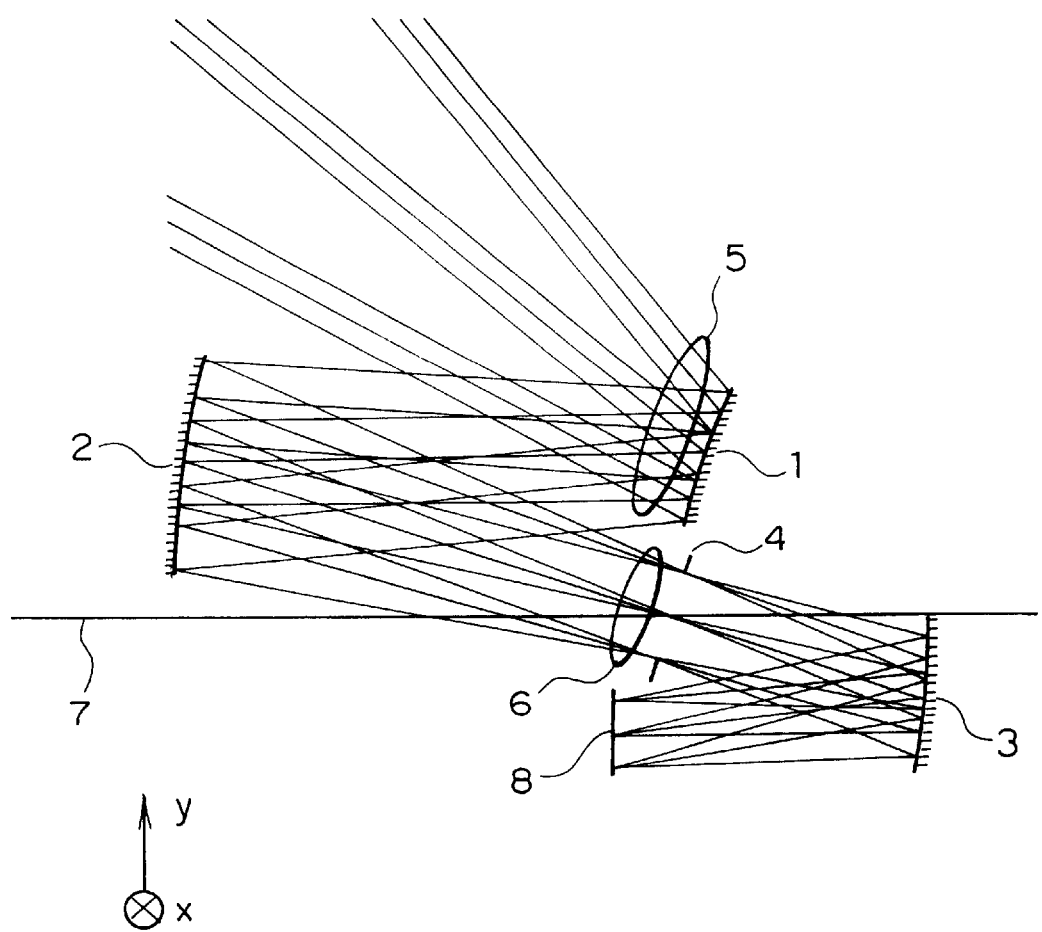
FIG. 1 is a cross-sectional view of a wide-angle catoptric system according to a first embodiment of the present invention.

FIG. 1 is a cross-sectional view of a wide-angle catoptric system according to a first embodiment of the present invention. In FIG. 1, a primary reflecting mirror 1 has a convex spherical surface. A secondary reflecting mirror 2 has a concave spherical surface. A tertiary reflecting mirror 3 has a concave spherical surface. A circular diaphragm 4 is located in close proximity to the primary reflecting mirror 1.

Moreover, a luminous flux 5 is the flux of incident beams to the primary reflecting mirror 1, and a luminous flux 6 is the flux of the output beams from the secondary reflecting mirror 2. An optical axis 7 is a straight line connecting the curvature center of the primary reflecting mirror 1 to the curvature center of the secondary reflecting mirror 2. The center of the diaphragm 4 is on the optical axis 7. However, the center of curvature of the tertiary reflecting mirror 3 is not on the optical axis 7 and the mirror is decentered. An incident beam is relayed onto image plane 8.

The parallel direction of movement for the tertiary reflecting mirror 3 is the direction of an arrow y in FIG. 1 (the y direction is the orthogonal direction to the axis 7 in a plane, including the optical axis 7, where a luminous flux is output by the tertiary reflecting mirror 3), and the direction that is orthogonal to the y direction and the optical axis 7 is the x direction. Incident beams are tilted relative to the optical axis 7 in the y direction, thus preventing shading caused by overlapping beams.

The F-number, which indicates the brightness of the wide-angle catoptric system, is in inverse proportion to the aperture size of the diaphragm 4 and is in proportion to focal lengths. Therefore, in order to provide a bright optical system with a small F-number, the aperture of the diaphragm 4 may be widened, or the focal length may be shortened. However, a luminous flux becomes wider as the aperture of the diaphragm 4 is enlarged, thus mutually overlapping the luminous flux 5 with the luminous flux 6, resulting in shading. Thus, a bright optical system can be provided by shortening focal lengths in this wide-angle catoptric system.

In order to shorten focal lengths of a catoptric system, the power of a reflecting mirror having positive power may be increased while the power of a reflecting mirror having negative power may be reduced. Specifically, in the wide-angle catoptric system mentioned above, the power of the primary reflecting mirror 1 may be reduced while the power of the secondary reflecting mirror 2 and the tertiary reflecting mirror 3 may be increased. However, in changing the power of the primary reflecting mirror 1 and the secondary reflecting mirror 2 located in front of the diaphragm 4 on the optical path, the luminous flux 5 of incident beams to the primary reflecting mirror 1 widens, thus mutually overlapping the luminous flux 5 with the luminous flux 6 and resulting in shading. Accordingly, by reducing the curvature radius of the tertiary reflecting mirror 3 and increasing the power, a bright optical system having a short focal length may be provided in the above-noted wide-angle catoptric system.

In catoptric systems, the major aberrations deteriorating the picture quality of images are spherical aberration, coma, field curvature, and astigmatism. By setting parameters such as the radii of curvatures of reflecting mirrors and surface spacing based on the following principles, the wide-angle catoptric system mentioned above reduces each aberration.

Spherical aberration is caused by the deviation of focal positions between central beams and peripheral beams. In the above-mentioned wide-angle catoptric system, optical parameters are determined so as to mutually cancel the deviations of focal positions of peripheral beams at all three mirrors, the primary reflecting mirror 1, the secondary reflecting mirror 2 and the tertiary reflecting mirror 3, thus minimizing spherical aberration to an acceptable level.

Coma is caused by the deviation of focal positions between central beams and peripheral beams for the light input with an angle relative to the optical axis 7. Coma is based on the spherical aberration mentioned above and the location of an optical pupil. When there is spherical aberration, the scale of coma changes in accordance with the location of a pupil. In the above-mentioned wide-angle catoptric system, coma is canceled by placing a pupil at a suitable location for the above-mentioned acceptably minimized spherical aberration.

Field curvature is the phenomenon whereby an image plane has a curvature, and the radius of curvature thereof is expressed in the so-called Petzval sum. In the above-mentioned wide-angle catoptric system, this aberration is corrected by minimizing the Petzval sum to provide an almost flat image plane and, moreover, by tilting the image plane in accordance with the curve.

Since the curvature radius of the tertiary reflecting mirror 3 is reduced to brighten the optical system in the wide-angle catoptric system mentioned above, astigmatism is particularly a problem. Astigmatism is caused when the shapes of reflecting mirrors for incident beams are different between a tangential direction and a sagittal direction. Specifically, astigmatism is zero for the beams vertically input to a reflecting mirror, and astigmatism increases as the tilted angle of input beams becomes large.

Additionally, astigmatism becomes large as the curvature radius of a reflecting mirror becomes smaller. In the wide-angle catoptric system described above, astigmatism becomes large on the tertiary reflecting mirror 3 since the curvature radius of the tertiary reflecting mirror 3 is small. Astigmatism appears as the difference in the curvature radii of an image plane between the tangential direction and the sagittal direction.

In the wide-angle catoptric system described above, the differences in curvature radii cancel each other at all three mirrors, the primary reflecting mirror 1, the secondary reflecting mirror 2 and the tertiary reflecting mirror 3. Furthermore, by moving the tertiary reflecting mirror 3 parallel to the y direction, the incident beams to the reflecting mirror are made nearly vertical, minimizing astigmatism. Since astigmatism increases in proportion to the square of an angle of incident beams to the reflecting mirror, the angle of incident beams can be reduced, for instance, by tilting the tertiary reflecting mirror 3 in the direction of lesser astigmatism; in other words, in the direction where the incident beams become nearly vertical, thereby reducing astigmatism.

Although the tertiary reflecting mirror 3 is moved parallel to the y direction in the wide-angle catoptric system mentioned above, the same effect can also be obtained by tilting the tertiary reflecting mirror 3 in the direction of lesser astigmatism. There is no doubt that the tertiary reflecting mirror 3 can be moved parallel to the y direction and can be tilted in the direction of lesser astigmatism at the same time.

Moreover, even though the surfaces of the primary reflecting mirror 1, the secondary reflecting mirror 2 and the tertiary reflecting mirror 3 are all spherical in this embodiment, they can also be aspherical. When an aspherical reflecting mirror is used, the spherical aberration generated by brightening an optical system, for instance, may be corrected with high precision. The spherical aberration results from spherical reflecting surfaces, and may not be fully corrected solely by spherical reflecting mirrors. Any of the primary reflecting mirror 1, the secondary reflecting mirror 2 and the tertiary reflecting mirror 3 may have an aspherical surface, or a plurality of the mirror surfaces may be aspherical.

Figure 2:
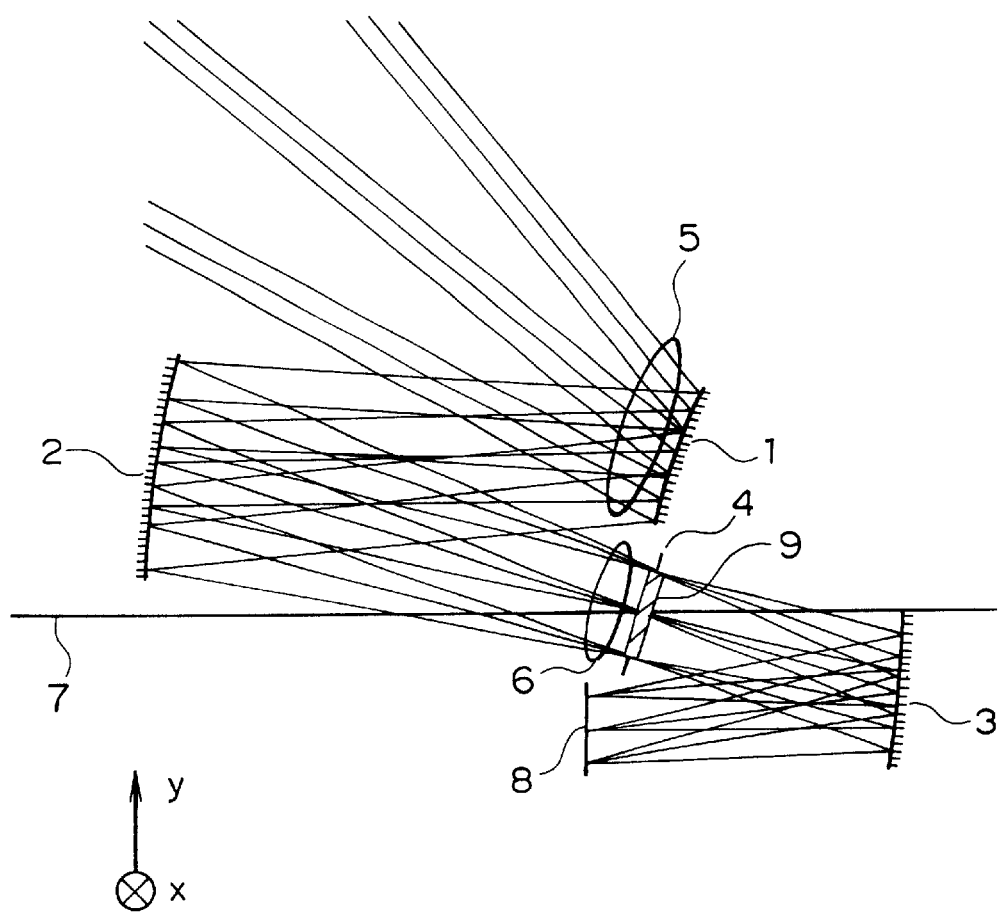
FIG. 2 is a cross-sectional view, showing the insertion of a transmission-type aberration correction plate using the refractive action of light.

An aberration correction plate may be provided in close proximity to the diaphragm 4 in addition to, or instead of shaping a reflecting mirror in an aspherical shape as mentioned above. FIG. 2 shows a wide-angle catoptric system whereby a transmission-type aberration correction plate using the refractive action of light is inserted. In the figure, the reference numerals 1 to 8 are the same as the ones in FIG. 1. An aberration correction plate 9 is deposited in close proximity to the diaphragm 4.

This aberration correction plate 9 is particularly effective in correcting spherical aberration with high precision. As the plate has a small refractive action of bending light, the deterioration of picture quality is small even in case of materials having chromatic aberration. Thus, a material capable of transmitting light having a desirable wavelength may be used for the aberration correction plate 9. Although the aberration correction plate 9 is a transmission type using the refractive action of light in FIG. 2, the aberration correction plate may be a reflecting mirror as long as it performs a similar function to correct aberration.

Figure 3:
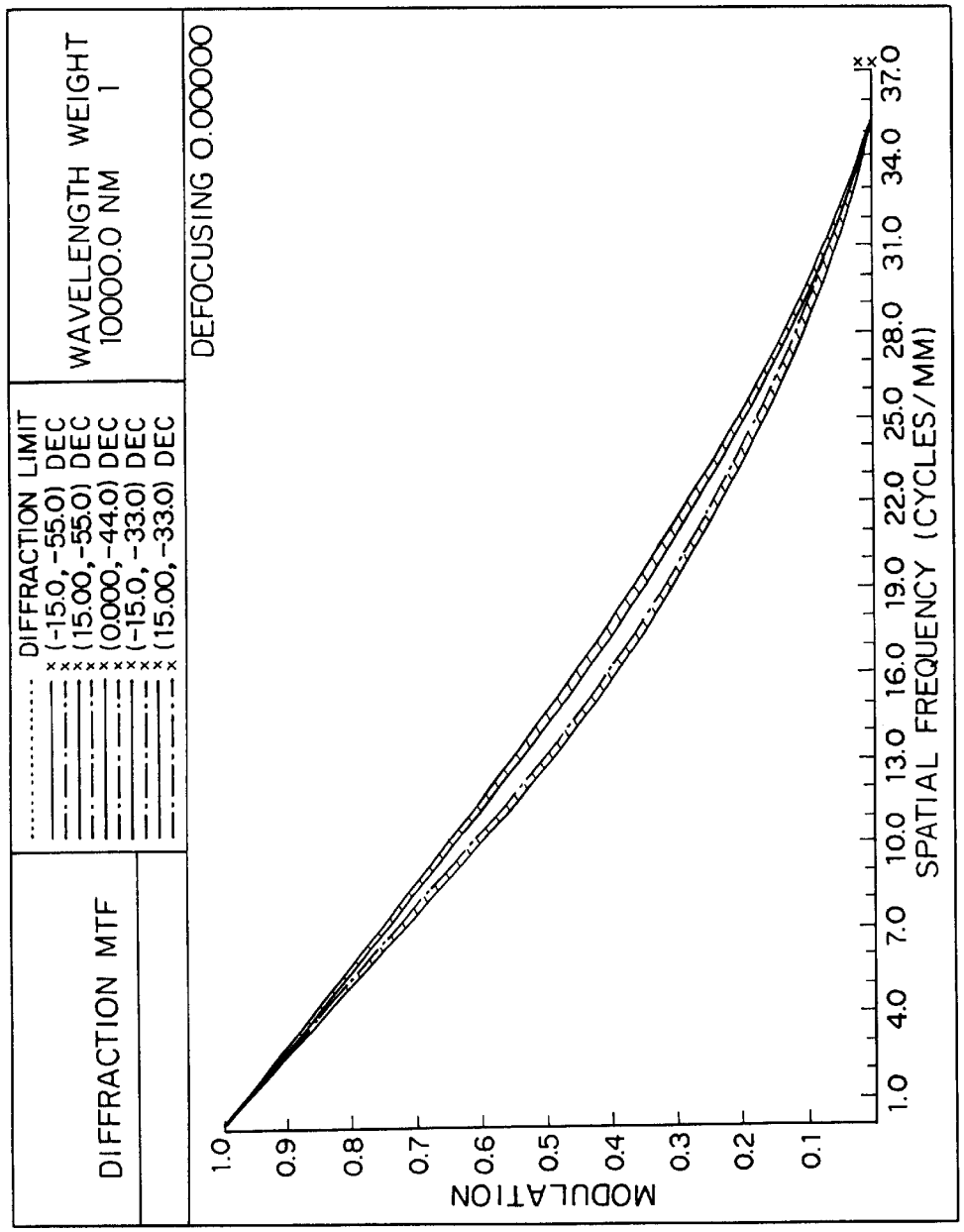
FIG. 3 is a graph, showing MTF (Modulation Transfer Function) of the wide-angle catoptric system according to the first embodiment.

FIG. 3 shows MTF (Modulation Transfer Function) of the wide-angle catoptric system in this embodiment, and the standard wavelength of incident beams is 10 $\mu$m. The wide-angle catoptric system has a focal length of 25 mm, a field of view of 30° times 22°, and F/2.5. Incident beams are input with an angle of 44°±11° relative to the optical axis 7 in the y direction. Additionally, F/2.5 is the value on the optical axis 7. Since the incident beams have an angle in respect to the optical axis 7 as described above, the actual F is 2.7. According to FIG. 3, the diffraction limit can be nearly obtained.

Second Embodiment

In First Embodiment, the diaphragm 4 is circular. Since a luminous flux is broadened by widening the diaphragm 4 in the y direction, the luminous flux 5 of incident beams to the primary reflecting mirror 1 and the luminous flux 6 of the output beams from the secondary reflecting mirror 6 overlap each other, resulting in shading. On the contrary, the luminous fluxes do not mutually overlap as the diaphragm is opened in the x direction, thus causing no shading. Therefore, a bright optical system can be provided without shading by broadening a luminous flux in the x direction with an elliptical diaphragm having a long axis in the x direction, or the like.

Third Embodiment

Figure 4:
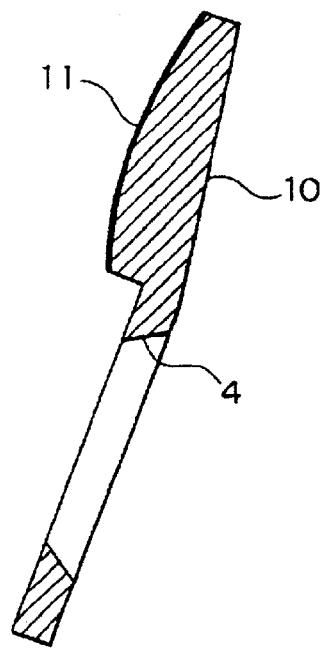
FIG. 4 is a cross-sectional view, showing a portion of a wide-angle catoptric system according to a third embodiment.
Figure 5:
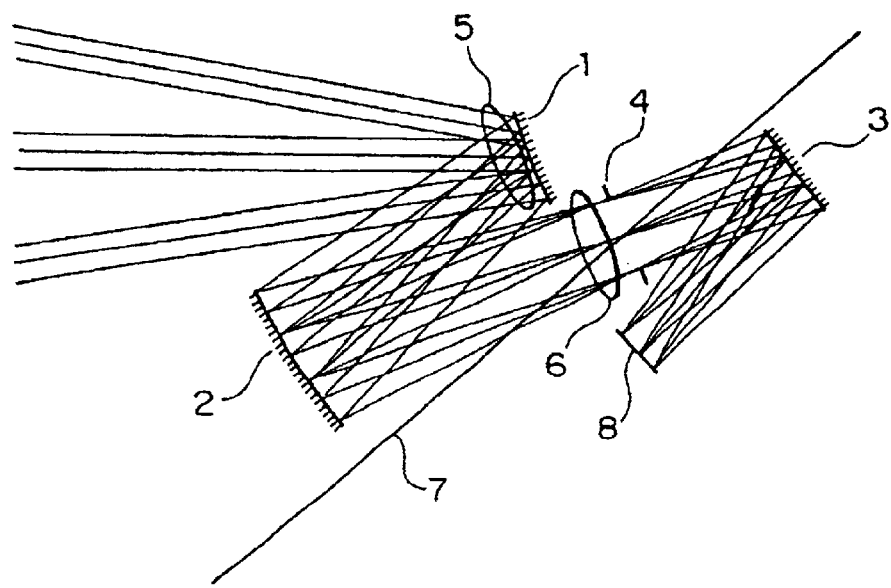
FIG. 5 is a cross-sectional view of a conventional wide-angle catoptric system.

FIG. 4 is a cross-sectional view, showing a portion of a wide-angle catoptric system in Third Embodiment. A substrate 10 of the primary reflecting mirror 1 is formed in one body with the diaphragm 4. A reflecting member 11 is the reflecting surface of the primary reflecting mirror 1. Other components are the same as those in First Embodiment.

According to this configuration, as the primary reflecting mirror 1 and the diaphragm 4 are integrated into each other, the number of components may be reduced and the manufacturing procedure as well as the assembling procedure of components may be simplified. Moreover, since there is no tolerance between integrated components during the assembling process, a wide-angle catoptric system may be easily assembled as a whole.

The wide-angle catoptric system according to an invention includes, successively from an object, a secondary reflecting mirror having a concave surface, a primary reflecting mirror having a convex surface and a tertiary reflecting mirror having a concave surface, and produces images by reflecting the luminous influx input from the object at the primary reflecting mirror, the secondary reflecting mirror and the tertiary reflecting mirror successively. The system also includes a diaphragm arranged in close proximity to the primary reflecting mirror so as to have an optical axis pass through the center of the diaphragm; the optical axis is a straight line connecting the curvature center of the primary reflecting mirror to the curvature center of the secondary reflecting mirror. The tertiary reflecting mirror has its center of curvature decentered from the optical axis in the direction of lesser astigmatism. Accordingly, the system can reduce astigmatism and will not deteriorate the picture quality of images.

Moreover, the tertiary reflecting mirror may be moved in parallel to a surface which is orthogonal to the optical axis, thus decentering the center of curvature thereof from the optical axis. Therefore, the system can reduce astigmatism and will not deteriorate the picture quality of images.

Furthermore, the tertiary reflecting mirror is preferably arranged with its reflecting surface tilted from a surface which is orthogonal to the optical axis, in the direction of lesser astigmatism. Thus, the system can further reduce astigmatism and will not deteriorate the picture quality of images.

Also, the wide-angle catoptric system according to another invention includes, successively from an object, a secondary reflecting mirror having a concave surface, a primary reflecting mirror having a convex surface and a tertiary reflecting mirror having a concave surface, and produces images by reflecting the luminous flux input from the object at the primary reflecting mirror, the secondary reflecting mirror and the tertiary reflecting mirror successively. The system also includes a diaphragm arranged in close proximity to the primary reflecting mirror so as to have an optical axis pass through the center of the diaphragm; as the optical axis is a straight line connecting the curvature center of the primary reflecting mirror to the curvature center of the secondary reflecting mirror. The tertiary reflecting mirror has its curvature center on the optical axis, and the reflecting surface thereof is tilted from a surface which is orthogonal to the optical axis, in the direction of lesser astigmatism. Thus, the system can reduce astigmatism and will not deteriorate the picture quality of images.

Moreover, at least one of the primary reflecting mirror, the secondary reflecting mirror and the tertiary reflecting mirror may have an aspherical surface. Accordingly, the spherical aberration generated by brightening the optical system can be corrected with high precision.

Furthermore, the system may further include an aberration correction plate in close proximity to the diaphragm so as to reduce spherical aberration. Thus, the spherical aberration can be corrected with high precision.

Additionally, the diaphragm may be non-circular. Therefore, a luminous flux can be broadened, and a bright optical system can be provided without shading.

Moreover, the diaphragm may be in one body with the primary reflecting mirror. Accordingly, the number of components may be reduced, and the manufacturing procedure and the assembling procedure of components may be simplified. In addition, since there is no tolerance for integrated components during the assembling process, the wide-angle catoptric system may be easily assembled as a whole.

What is claimed is:

1. A wide-angle catoptric system comprising, successively from an object, a secondary reflecting mirror having a concave surface, a primary reflecting mirror having a convex surface and a tertiary reflecting mirror having a concave surface wherein images are formed by reflecting a luminous flux incident from the object at said primary reflecting mirror, said secondary reflecting mirror and said tertiary reflecting mirror successively; and a diaphragm arranged in close proximity to said primary reflecting mirror so as to have an optical axis, which is a straight line connecting a curvature center of said primary reflecting mirror to a curvature center of said secondary reflecting mirror, pass through a center of the diaphragm; wherein said tertiary reflecting mirror has a center of curvature thereof decentered from said optical axis in a direction of lesser astigmatism.

2. The wide-angle catoptric system according to claim 1, wherein said tertiary reflecting mirror is moved in parallel to a surface which is orthogonal to said optical axis so as to decenter a center of curvature thereof from said optical axis.

3. The wide-angle catoptric system according to claim 1, wherein said tertiary reflecting mirror is arranged with a reflecting surface thereof tilted from a surface which is orthogonal to said optical axis, in a direction of lesser astigmatism.

4. A wide-angle catoptric system comprising, successively from an object, a secondary reflecting mirror having a concave surface, a primary reflecting mirror having a convex surface and a tertiary reflecting mirror having a concave surface wherein images are formed by reflecting a luminous flux incident from the object at said primary reflecting mirror, said secondary reflecting mirror and said tertiary reflecting mirror successively; and a diaphragm arranged in close proximity to said primary reflecting mirror so as to have an optical axis, which is a straight line connecting a curvature center of said primary reflecting mirror to a curvature center of said secondary reflecting mirror, pass through a center of the diaphragm; wherein said tertiary reflecting mirror has a center of curvature thereof on said optical axis and a reflecting surface thereof is tilted from a surface which is orthogonal to said optical axis in a direction of lesser astigmatism.

5. A wide-angle catoptric system comprising:
a multi-mirror optical system having three mirrors, the optical system including:
a primary convex reflecting mirror having a first center of curvature;
a secondary concave reflecting mirror having a second center of curvature, said first and second centers-of curvature being connected by a straight line defining the optical axis of said optical system; and
a tertiary concave reflecting mirror having a third center of curvature, the third center of curvature not being on said optical axis, the distance of said third center of curvature from said optical axis being in a direction of lesser astigmatism.

6. The wide-angle catoptric system according to claim 5, further comprising a diaphragm arranged in close proximity to said primary reflecting mirror wherein said optical axis passes through a center of said diaphragm.

7. The wide-angle catoptric system according to claim 6, wherein at least one of said primary reflecting mirror, said secondary reflecting mirror and said tertiary reflecting mirror has an aspherical surface.

8. The wide-angle catoptric system according to claim 7, wherein at least one of said primary reflecting mirror, said secondary reflecting mirror, and said tertiary reflecting mirror has a spherical surface.

9. The wide-angle catoptric system according to claim 6, further comprising an aberration correction plate in close proximity to said diaphragm so as to reduce spherical aberration.

10. The wide-angle catoptric system according to claim 6, wherein said diaphragm is non-circular.

11. The wide-angle catoptric system according to claim 6, wherein said diaphragm is in one body with said primary reflecting mirror.

12. The wide-angle catoptric system according to claim 5, wherein said primary reflecting mirror, said secondary reflecting mirror, and said tertiary reflecting mirror have spherical surfaces.

13. The wide-angle catoptric system of claim 5 wherein said multi-mirror optical system has only three mirrors.

* * * * *